INTERCEPTOR TRANSFORMER FOR MULTI-BINARY INFORMATION STORAGE

Filed April 2, 1964 2 Sheets-Sheet 1

INVENTOR.
JOHN R. WIEGAND

BY

Polachek & Saulsbury

ATTORNEYS

Dec. 14, 1965 J. R. WIEGAND 3,223,987

INTERCEPTOR TRANSFORMER FOR MULTI-BINARY INFORMATION STORAGE

Filed April 2, 1964 2 Sheets-Sheet 2

INVENTOR.
John R. Wiegand
BY
Polachek & Saulsbury
ATTORNEYS.

United States Patent Office 3,223,987
Patented Dec. 14, 1965

3,223,987

INTERCEPTOR TRANSFORMER FOR MULTI-BINARY INFORMATION STORAGE

John R. Wiegand, 882 Balfour St., Valley Stream, N.Y.
Filed Apr. 2, 1964, Ser. No. 356,724
12 Claims. (Cl. 340—174)

This invention relates to an interceptor transformer used for storage of multi-digit binary information.

The invention is an improvement over the interceptor transformer described in my copending application 47,-832, filed August 5, 1960, now Patent No. 3,137,842, as well as the interceptor transformers described in my prior Patents 2,740,096; 2,798,987; 2,872,653 and 2,910,654.

The invention is related to memory elements with more than one binary magnetic state used to store more than one binary information bit of a "1" or a "0" in one memory element. The invention particularly involves an interceptor transformer which can store from 10 to 40 binary information states, with a destructive readout of the information from the transformer.

One object of the invention is to provide an improved interceptor transformer of economical construction, which can store many binary "0's" and "1's" to produce a binary code having a destructive readout.

Another object of the invention is to provide an interceptor transformer including a memory core for producing a successive string of pulses corresponding to the prior history of the circuit in which it is arranged.

Another object is to provide an interceptor transformer as an improved memory device for transferring a pulse train from one stage of an electric circuit to another.

Another object is to provide an improved economical magnetic device for actuating an electronic relay circuit with a multi-digit binary code.

A further object is to provide a magnetic device connected to an electronic relay circuit, the device being adapted to facilitate recall of many prior conditions of the electronic relay circuit, when the circuit is reenergized.

A still further object is to provide an inexpensive interceptor transformer utilizing a crossed magnetic core composed of a material having appreciable magnetic retentivity, the transformer being constructed so that the core is able to store many separate positive and/or negative states produced by alternating the polarity of a slowly decreasing current, and so that the core is able to recall these conditions with a slowly rising direct current.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3:
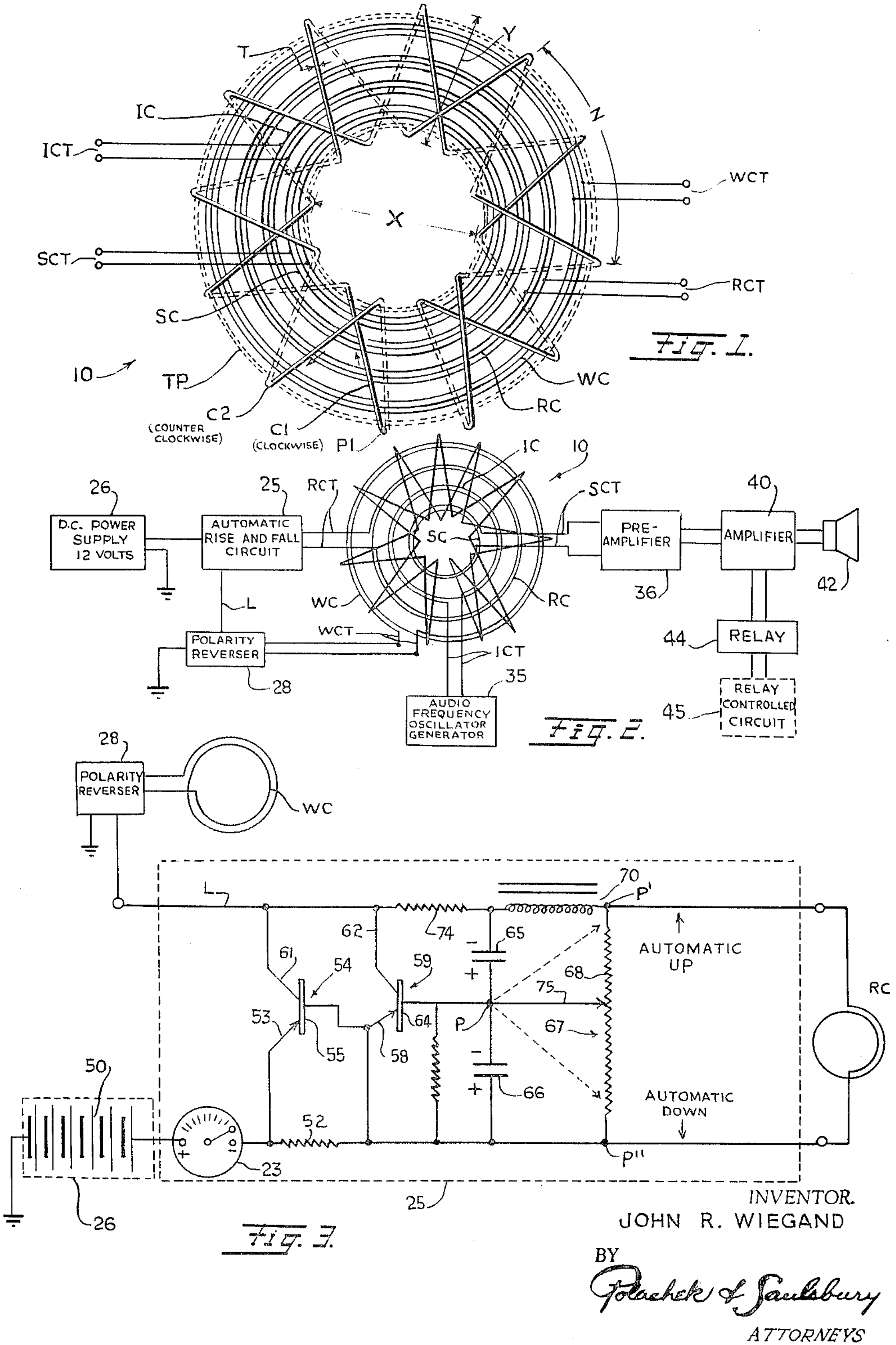
FIG. 1 is a diagrammatic representation of an interceptor transformer embodying the invetion.
FIG. 2 is a block diagram of an electronic circuit including the interceptor transformer.
FIG. 3 is a schematic diagram of parts of the circuit of FIG. 2.

In the present invention the readout or playback is the reverse of what has been written in or recorded, however it is intended that each recorded code or pulse train means the same thing in reverse. The recorded code is like a palindrome in that it reads and means the same when read forwardly and backwardly. For example, a well-known palindrome in Morse code is the call S O S, i.e. — — — . . . — — —. A pulse train recording this call according to the present invention reads the same even though it is read out in reverse order from the order of writing it in.

The invention will be more completely understood from the following detailed description taken together with the drawing to which reference is now made.

The interceptor transformer 10 shown diagrammatically in FIG. 1, has a generally ring-like or toroidal form in which four dimensions X, Y, Z and T are critical and interrelated. The transformer has four circularly wound coils, including a write coil WC, a read coil RC, an interrogation coil IC and a sense or answer coil SC. Around these four coils is an insulating tape sheath TP indicated by dotted lines in FIG. 1. The four coils each have two terminals WCT, RCT, ICT and SCT, respectively. Helically wound around the four sheathed coils in opposite directions are two magnetic wire cores C1 and C2. In a typical and preferred embodiment, the interceptor transformer may have the following construction:

A. Write coil WC, 30 turns of #34 copper wire (0.006");
B. Read coil RC, 30 turns of #34 (0.006") wire, enameled nickel-iron 78% Ni–22% Fe;
C. Interrogation coil IC, 30 turns #40 (0.0031") wire, enameled nickel-iron 78% Ni–22% Fe;
D. Sense coil SC, 60 turns #40 (0.0031") wire, enameled nickel-iron 78% Ni–22% Fe;
E. Core C1, 6 turns per inch around the four coils WC, RC, IC, SC, wound clockwise, 0.018" diameter, nickel-iron wire 52% Ni–48% Fe;
F. Core C2, 6 turns per inch around all four coils and core C1, wound counterclockwise, 0.018" diameter, nickel-iron wire, 52% Ni–48% Fe;
G. X dimension-interior diameter of the transformer, 1 inch;
H. Y dimension-thickness of cross-sectional diameter of the transformer, 0.093 inch;
I. Z dimension-pitch of turns of cores C1 and C2 circumferentially of the transformer, 0.1666 inch;
J. T dimension-diameter of core wire, 0.018 inch.

The cores C1 and C2 form approximately 38 turns around the transformer with 19 crossings on the outside of the transformer. Cores C1 and C2 may be wound from one continuous length of wire, and may be joined at opposite ends at point P1 with core C2 wound 19 turns in reverse counterclockwise direction after core C1 is wound 19 turns in clockwise direction. The dimensions X, Y, Z and T are closely related to each other and can be proportionally larger or smaller. If they are proportionally larger, then the interrogation frequency must be reduced. If they are proportionally smaller, the interrogation frequency can be higher.

The optimum relationship of the dimensions X, Y, Z and T has been experimentally determined as follows, where the diameter T of the core wire is taken as the reference dimension:

$$Z = 4 \text{ times } T$$
$$Y = 5 \text{ times } T$$
$$X = 60 \text{ times } T$$

It was also found that the optimum ratio between the X, Y, Z and T dimensions holds true at smaller and larger dimensions. With larger dimensions at the same ratio an interrogation frequency of lower frequency or less cycles per second is needed, as will be explained in connection with FIG. 4. With smaller dimensions at the same ratio higher interrogation frequencies may be used.

The novel results obtained with the present invention depends in part on the basic fact that the core wire is drawn through many wire drawing dies in order to reduce it to dimension T. The wire is annealed between each drawing operation. Each drawing and annealing operation leaves behind a history of a layer within the wire with somewhat different characteristics for magnetic saturation. The invention makes use of this magnetic history. The magnetic circuit in the interceptor transformer develops around the Y dimension or cross-sectional diameter, starting with a small number of magnetic lines of force near the outside of the core wire and increasing toward the center of the core wire. The control, to keep different layers inside the core wire at a different polarity, is made possible by the ratio of X, Y, Z and T dimensions as pointed out above.

In the block diagram of circuit 20 shown in FIG. 2, the terminals RCT of read coil RC of interceptor transformer 10 are connected to an automatic rise and fall circuit 25, shown in greater detail in FIG. 3. A direct current power supply 26 is connected to circuit 25. A mechanical or electronic polarity reversing circuit 28, such as a motor-driven switch, is connected between the power supply 26 and line L of circuit 25. The write coil WC of the interceptor transformer 10 is connected to polarity reverser 28. An interrogating oscillator 35 is connected to terminals ICT of the interrogation coil IC. This oscillator is a conventional generator of audio frequencies. The terminals SCT of the sense or answer coil SC are connected to the input of a preamplifier 36. The output of the preamplifier is connected to the input of an amplifier 40. Amplifier 40 has one output connected to a loud-speaker 42 and another output connected to a relay 44 which may be connected to a relay control circuit 45.

The circuit 20 is used to determine the operating characteristics and capabilities of the interceptor transformer as will be explained in connection with FIG. 4, and may be regarded as a test setup.

FIG. 3 shows the automatic rise and fall current circuit 25. This circuit includes an ammeter 23 in series with the positive terminal of power supply 26, which may be a twelve volts battery 50. In series with meter 23 is a resistor 52. The emitter 53 of a transistor 54 is connected to resistor 52. The base 55 of the transistor is connected to resistor 56 also connected to resistor 52. The base 55 is connected to emitter 58 of a transistor 59. The collectors 61 and 62 of the two transistors are connected to line L. The negative terminal of the battery 50 is grounded. The base 64 of transistor 59 is connected between capacitors 65, 66. Resistor 73 is connected across capacitor 66. A potentiometer 67 has one end P′ of its resistor portion 68 connected to capacitor 66. The other end P″ of the resistor portion 68 is connected via a choke coil 70 to capacitor 65. A resistor 74 is connected between the junction capacitor 65 and line L. The positive end of capacitor 65 and negative end of capacitor 66 are connected to common point P which is connected to the movable arm 75 of the potentiometer. The circuit output is connected from potentiometer terminals P′, P″ to read coil RC. Line L is connected to polarity reverser 28. The terminals of write coil WC are connected to the polarity reverser 28.

Following is a listing of preferred values and components in circuit 25:

| | |
|---|---|
| Meter **23** | 0–500 milliamperes ammeter. |
| Resistor **52** | 5 ohms, 10 watts. |
| Transistor **54** | 2N1146. |
| Resistor **56** | 47 ohms, 5 watts. |
| Transistor **59** | 2N1740. |
| Capacitor **65** | 2K mfd. |
| Capacitor **66** | 2K mfd. |
| Potentiometer **67** | 100,000 ohms. |
| Choke coil **70** | 500 ohms. |
| Resistor **73** | 1000 ohms, 2 watts. |
| Resistor **74** | 4 ohms, 5 watts. |

Figure 4:
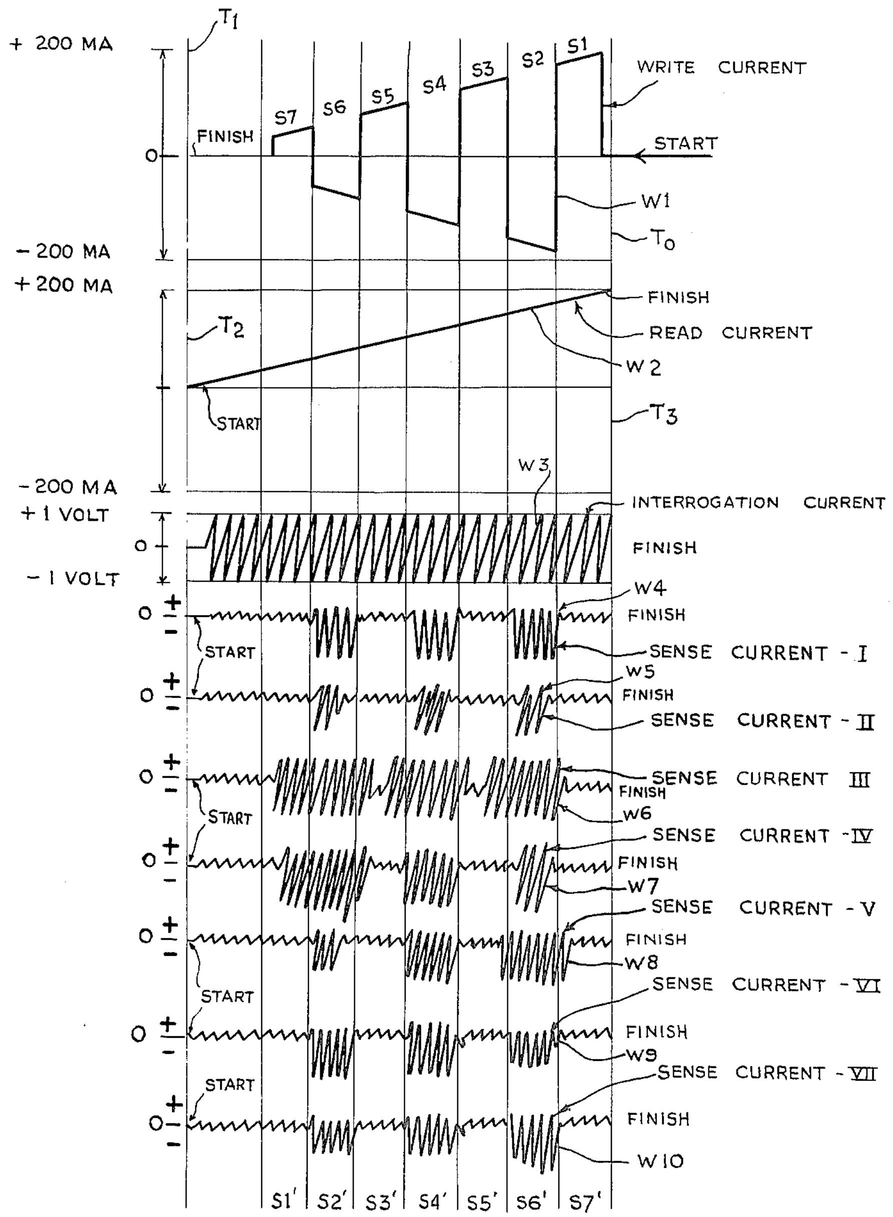
FIG. 4 shows graphically pulse diagrams representing oscillograph or oscilloscope patterns employed for comparison purposes in explaining the invention.

In FIG. 4, all the waveforms W1–W10 are plotted in seven coordinated equal time sections or periods S1–S7, S1′–S7′. In the first waveform W1, the start of the waveform is at the right end of the curve at time $t_0$ in period S7 and the end of the waveform is at the reference time $t_1$. In all other waveforms W2–W10 the start of the waveform is at time $t_2$ prior to time period S1′ and the end of the waveform is at the end of the time period S7′ at time $t_3$.

Waveform W1 represents an oscilloscope pattern of write current applied to the interceptor transformer in the setup 20 of FIG. 2. Direct current is fed via an automatic falling current control provided by circuit 25, into polarity reverser 28 and into the write coil WC of the interceptor transformer 10. It will be noted that the waveform has maximum magnitude (+200 milliamperes at the start of the writing period) and reverses positive and negative alternately in each successive time section with gradually decreasing magnet magnitude to zero at the finish or time $t_1$.

Waveform W2 shows an oscilloscope pattern of read current. This is a rising current as fed from automatic rise and fall circuit 25 into the read coil RC of the interceptor transformer. The read current rises from zero the starting reference time $t_2$ to maximum magnitude at time $t_3$. While the current is rising in coil RC, subsequent to a writing in of information as shown by waveform W1, the results illustrated by waveforms W4–W10 are obtained.

Waveform W3 represents an interrogation current of 150 cycles per second applied by the oscillator 35 at about 1 volt. This is needed to obtain the "answer" to what was written by waveform W1.

The sense or answer current obtained from the sense or answer coil SC is applied to preamplifier 36 and then to amplifier 40. The pulses obtained as an "answer" appear audibly at loud-speaker 42. Alternatively they appear as periodic pulses of actuations of relay 44 for use in relay controlled circuit 45.

Waveform W4 shows a series of three negative pulses occurring in time periods or section S2′, S4′ and S6′. This is the answer or sense current I provided by the sense coil SC representing the reverse of the written in information represented by waveform W1.

Waveform W5 shows a series of three substantially negative answer pulse trains occurring in time periods S2′, S4′ and S6′. This is the answer or sense current II as produced by sense coil SC representing the written in information represented by waveform W1. Waveform W5 shows the effect of changing the clockwise and counterclockwise winding of cores C1 and C2 to 9 turns per inch in the circumferential (Z) direction of the transformer, instead of 6 turns per inch as used in obtaining waveform W4. It will be noted that the pulse trains of sense current II are considerably shortened in time, in the three time periods S2′, S4′ and S6′.

Waveform W6 shows the answer pulse trains of sense current III obtained by changing the clockwise and counterclockwise winding of cores C1 and C2 to four turns per inch in the circumferential direction of the transformer. It will be noted that the time periods of the pulse trains are so lengthened that only a negligible time interval elapses between successive pulse trains.

Waveform W7 shows the answer pulse trains of sense current IV obtained when the internal diameter (X dimension) is changed to 1½ inches from 1 inch, with the winding of the cores C1 and C2 at six turns per inch circumferentially of the transformer (Z direction), in both clockwise and counterclockwise directions respectively. It will be noted that the first pulse train in time period S2′ is lengthened in duration and overlaps time periods S1′, S3′. The second pulse train occupies substantially the entire time period S4′ and the third pulse train is considerably shortened in time period S6′.

Waveform W8 shows the answer pulse trains of sense current V obtained when the dimensional ratio of X, Y and Z dimension is the optimum ratio of X=60 times *T*, $Y=5$ times $T$, $Z=4$ times $T$, but with the X dimension changed to ¾ of an inch instead of 1 inch, and with all other dimensions adjusted accordingly. It will be noted that the pulse trains have unequal time durations. The first pulse train in time period S2′ is considerably shortened. The second pulse train substantially occupies time period S4′ and the third pulse train is lengthened to overlap time periods S5′ and S7′.

Waveform W9 shows the answer pulse trains of sense current VI resulting when the T dimension is changed to 0.009″ in diameter or about one half of the 0.0018 dimension is the preferred embodiment. The X, Y and Z dimensions are the same as in the preferred embodiment. The pulse trains have progressively decreasing amplitude in the first, second and third pulse trains occurring in time periods S2′, S4′ and S6′, respectively.

Waveform W10 shows the answer pulse trains of sense current VII resulting when the diameter of the core wire (T dimension) is increased to 0.031 inch from 0.018 inch of the preferred embodiment. The X, Y and Z dimensions remain the same as in the preferred embodiment. It will be noted that the waveform has a progressively increasing amplitude in time periods S2′, S4′, and S6′, respectively.

From the waveforms of FIG. 4, it will be understood that the writing in of information is performed by applying an alternating current of gradually decreasing amplitude via the write coil WC. Depending on the dimensions of the interceptor transformer as many as forty bits of binary coded information may be recorded. The readout of the recorded information is performed in reverse order to the writing in during the application of a gradually increasing direct read current via read coil RC. The interrogation current is an alternating current of audio frequency applied via the interrogation coil IC. The sense or answer coil provides an alternating pulse train for each negative half cycle of recorded information. Waveforms W4–W10 all exhibit this characteristic. The variations in these waveforms are intended to illustrate the effects of varying the relative dimensions X, Y, Z and T of the interceptor transformer from the optimum experimentally determined ratios set forth above. It will be noted that answer waveform W4 is produced by the optimum relative dimensions of the transformer 10. The three senses pulse trains in time periods S2′, S4′ and S6′ each occupy the full time period corresponding to the negative polarity of the write current in time periods S6, S4 and S2, respectively, shown by waveform W1. This is an optimum form of readout. However, the readout shown by waveforms W5, W8, W9 and W10 will prove acceptable under certain conditions since the answer pulse trains are all wholly contained within the set limits of the time periods in which they occur.

The answer waveforms W6, W7 and W8 in which answer pulse trains overlap the limits of their prescribed time periods are objectionable. However, some limited overlap may be tolerable under certain conditions. For example, if overlap occurs at the beginning and end of a time period such as in time period S5′ of waveform W6, this may be tolerable if the separation of the pulse trains beginning and ending in this time period is at least one-tenth of the time period. Variation in the amplitudes of the answer pulse trains is generally objectionable but may be tolerable if the detection apparatus into which the answer pulses are fed can readily detect the pulse trains of minimum amplitude as read out information. If desired, this variation in amplitudes can be corrected by automatic volume or gain control circuits of known type.

It will be apparent that the interceptor transformer makes possible multiple digit binary storage and readout. The readout necessarily results in destruction of the stored information. This is highly desirable in systems where a coded command is recorded and is then read out for performance. The readout clears the memory for recording of the next command. A novel advantageous feature of the invention is the reverse readout so that palindrome type of coded information is preferably stored. An important advantage of such a symmetrical or bilateral readout is that error detection is simplified. A variation from symmetry of the readout will indicate an error either at write in or at readout so that the fault can be immediately sought and corrected.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent, is:

1. An interceptor transformer for binary storage and destructive readout of multi-digit binary coded information, comprising a write coil, read coil, interrogation coil and sense coil, the four coils being made of wire circularly wound into ring-like form, a first magnetic core wire helically wound in one direction with uniform pitch around the four coils, and a second magnetic core wire helically wound in an opposite direction with uniform pitch around the four coils and first core wire, the two core wires being wound around the entire circumferential extent of the ring-like form defined by the four coils, each of said coils having a pair of separate terminals for connection to external circuit means.

2. An interceptor transformer for binary storage and destructive readout of multi-digit binary coded information, comprising a write coil for receiving information pulses in the form of an alternating write-in current of progressively diminishing amplitude, a read coil for receiving a read bias direct current of progressively increasing magnitude, an interrogation coil for receiving an alternating audio frequency interrogating current, a sense coil for producing answer pulse trains in time periods coordinated with time periods of pulses of the write-in current, the four interwound coils being circularly wound into ring-like form, a first magnetic core made of wire helically wound clockwise around the four coils, and a second magnetic core made of wire helically wound counterclockwise around the four coils and first magnetic core wire, the two core wires having substantially uniform pitch for the entire circumferential extent of said ring-like form.

3. An interceptor transformer for binary storage and destructive readout of multi-digit binary coded information, comprising a write coil for receiving information pulses in the form of an alternating write-in current of progressively diminishing amplitude, a read coil for receiving a read bias direct current of progressively increasing magnitude, an interrogation coil for receiving an alternating audio frequency interrogating current, a sense coil for producing answer pulse trains in time periods coordinated with time periods of pulses of the write-in current, the four interwound coils being circularly wound into ring-like form, an insulating sheath around the four coils, a first magnetic core made of wire helically wound clockwise around the sheathed four coils, and a second magnetic core made of wire helically wound counterclockwise around the sheathed coils and first magnetic core wire, the two core wires having substantially uniform pitch for the entire circumferential extent of said ring-like form, the write coil being made of highly conductive nonmagnetic wire, the read coil, interrogation coil and sense coil being made of insulated, conductive magnetic wire, the magnetic core wires being made of material having less electrical conductivity and greater magnetic retentivity than the wire of the read, interrogation and sense coils, said core wires preferably being made from a single length of magnetic wire having a body retaining a history of multiple drawn and annealed layers of different magnetic retentivity.

4. An interceptor transformer for binary storage and destructive readout of multi-digit binary coded information, comprising a write coil for receiving information pulses in the form of an alternating write-in current of progressively diminishing amplitude, a read coil for receiving a read bias direct current of progressively increasing magnitude, an interrogation coil for receiving an alternating audio frequency interrogating current, a sense coil for producing answer pulse trains in time periods coordinated with time periods of pulses of the write-in current, the four coils being circularly wound into ring-like form, an insulating sheath around the four coils, a first magnetic core made of wire helically wound clockwise around the four coils, and a second magnetic core made of wire helically wound counterclockwise around the four coils and first magnetic core wire, the two core wires having substantially uniform pitch for the entire circumferential extent of said ring-like form, the write coil being made of highly conductive nonmagnetic wire, the read, interrogation and sense coils being made of insulated conductive magnetic wire, the magnetic cores being made of repeatedly die-drawn and annealed magnetic wire having less electrical conductivity and greater magnetic retentivity than the wire of the read, interrogation and sense coils.

5. An interceptor transformer for binary storage and destructive readout of multi-digit binary coded information, comprising a write coil for receiving information pulses in the form of an alternating write-in current of progressively diminishing amplitude, a read coil for receiving a read bias direct current of progressively increasing magnitude, an interrogation coil for receiving an alternating audio frequency interrogating current, a sense coil for producing answer pulse trains in time periods coordinated with time periods of pulses of the write-in current, the four coils being circularly wound into ring-like form, an insulating sheath around the four coils, a first magnetic core made of wire helically wound clockwise around the sheathed coils, and a second magnetic core made of wire helically wound counterclockwise around the sheathed coils and first magnetic core wire, the two core wires having substantially uniform pitch for the entire circumferential extent of said ring-like form, the write coil being made of highly conductive nonmagnetic wire, the read, interrogation and sense coils being made of insulated conductive magnetic wire, the magnetic cores being made of repeatedly die-drawn and annealed magnetic wire having less electrical conductivity and greater magnetic retentivity than the wire of the read, interrogation and sense coils, the four coils and two magnetic cores defining a toroidal body having the following optimum relative dimensions: $X=60$ times $T$, $Y=5$ times $T$, $Z=4$ times $T$, where T is the diameter of the magnetic wire of the cores, X is the internal diameter of said toroidal body, Y is the cross-sectional diameter of the toroidal body, and Z is the pitch of each magnetic core wire taken circumferentially of said toroidal body.

6. An interceptor transformer for binary storage and destructive readout of multi-digit binary coded information, comprising a write coil for receiving information pulses in the form of an alternating write-in current of progressively diminishing amplitude, a read coil for receiving a read bias direct current of progressively increasing magnitude, an interrogation coil for receiving an alternating audio frequency interrogating current, a sense coil for producing answer pulse trains in time periods coordinated with time periods of pulses of the write-in current, the four coils being circularly wound into ring-like form, an insulating sheath around the four coils, a first magnetic core made of wire helically wound clockwise around the sheathed coils, and a second magnetic core made of wire wound counterclockwise around the sheathed coils and first magnetic core wire, the two core wires having substantially uniform pitch for the entire circumferential extent of said ring-like form, the four coils and two magnetic cores defining a toroidal body having the following optimum relative dimensions: $X=60$ times $T$, $Y=5$ times $T$, $Z=4$ times $T$, where T is the diameter of the magnetic wire of the cores, X is the internal diameter of said toroidal body, Y is the cross-sectional diameter of the toroidal body, and Z is the pitch of each magnetic core wire taken circumferentially of said toroidal body.

7. An interceptor transformer for binary storage and destructive readout of multi-digit binary coded information, comprising a write coil for receiving information pulses in the form of an alternating write-in current of progressively diminishing amplitude, a read coil for receiving a read bias direct current of progressively increasing magnitude, an interrogation coil for receiving an alternating audio frequency interrogating current, a sense coil for producing answer pulse trains in time periods coordinated with time periods of pulses of the write-in current, the four coils being circularly wound into ring-like form, an insulating sheath around the coils, a first magnetic core made of wire helically wound clockwise around the sheathed coils, and a second magnetic core made of wire helically wound counterclockwise around the sheathed coils and first magnetic core wire, the two core wires having substantially uniform pitch for the entire circumferential extent of said ring-like form, the write coil being made of copper wire having 0.006 inch diameter, the read coil being made of nickel-iron wire having 0.006 inch diameter, the interrogation coil and sense coils being made of nickel-iron wire having 0.0031 inch diameter, the composition of the wire of the read, interrogation and sense coils being 78% nickel and 22% iron, the magnetic core wires having 0.018 inch diameter and a composition of 52% nickel, 48% iron.

8. An interceptor transformer for binary storage and destructive readout of multi-digit binary coded information, comprising a write coil for receiving information pulses in the form of an alternating write-in current of progressively diminishing amplitude, a read coil for receiving a read bias direct current of progressively increasing magnitude, an interrogation coil for receiving an alternating audio frequency interrogating current, a sense coil for producing answer pulse trains in time periods coordinated with time periods of pulses of the write-in current, the four coils being wound into ring-like form, an insulating sheath around the coils, a first magnetic core made of wire helically wound clockwise around the sheated coils, and a second magnetic core made of wire helically wound counterclockwise around the sheathed coils and first magnetic core wire, the two core wires having substantially uniform pitch for the entire circumferential extent of said ring-like form, the write coil being made of copper wire having 0.006 inch diameter, the read coil being made of nickel-iron wire having 0.006 inch diameter, the interrogation coil and sense coils being made of nickel-iron wire having 0.0031 inch diameter, the composition of the wire of the read, interrogation and sense coils being 78% nickel and 22% iron, the magnetic core wires having 0.018 inch diameter and a composition of 52% nickel, 48% iron, the four coils and two magnetic cores defining a toroidal body having the following optimum relative dimensions: $X=60$ times $T$, $Y=5$ times $T$, $Z=4$ times $T$, where T is the diameter of the magnetic wire of the cores, X is the internal diameter of said toroidal body, Y is the cross-sectional diameter of the toroidal body, and Z is the pitch of each magnetic core wire taken circumferentially of said toroidal body.

9. An interceptor transformer for binary storage and destructive readout of multi-digit binary coded information, comprising a write coil, read coil, interrogation coil and sense coil, the four coils being made of wire circularly wound into a ring-like form, a first magnetic core wire helically wound in one direction with uniform pitch around the four coils, and a second magnetic core wire wound in an opposite direction with uniform pitch around the four coils and first core wire, the two core wires being wound around the entire circumferential extent of the ring-like form defined by the four coils, each of said coils having a pair of separate terminals for connection to external circuit means, the four coils and two magnetic wound cores defining a toroidal body having the following optimum relative dimensions: $X=60$ times $T$, $Y=5$ times $T$, $Z=4$ times $T$, where T is the diameter of the magnetic wire of the cores, X is the internal diameter of said toroidal body, Y is the cross-sectional diameter of the toroidal body, and Z is the pitch of each magnetic core wire taken circumferentially of said toroidal body.

10. An interceptor transformer for binary storage and destructive readout of multi-digit binary coded information, comprising a write coil, read coil, interrogation coil and sense coil, the four coils being made of wire circularly wound into ring-like form, an insulating sheath around the four coils, a first magnetic core wire helically wound in one direction with uniform pitch around the four sheathed coils, and a second magnetic core wire helically wound in an opposite direction with uniform pitch around the four sheathed coils and first core wire, the two core wires being wound around the entire circumferential extent of the ring-like form defined by the four coils, each of said coils having a pair of separate terminals for connection to external circuit means, the four coils and two magnetic cores defining a toroidal body having the following optimum relative dimensions: $X=60$ times $T$, $Y=5$ times $T$, $Z=4$ times $T$, where T is the diameter of the magnetic wire of the cores, X is the internal diameter of said toroidal body, Y is the cross-sectional diameter of the toroidal body, and Z is the pitch of each magnetic core wire taken circumferentially of said toroidal body, the write coil being made of copper wire having 0.006 inch diameter, the read coil being made of nickel-iron wire having 0.006 inch diameter, the interrogation coil and sense coils being made of nickel-iron wire having 0.0031 inch diameter, the composition of the wire of the read, interrogation and sense coils being 78% nickel and 22% iron, the magnetic core wires having 0.018 inch diameter and a composition of 52% nickel, 48% iron.

11. An interceptor transformer for binary storage and destructive readout of multi-digit binary coded information, comprising a write coil for receiving information pulses in the form of an alternating write-in current of progressively diminishing amplitude, a read coil for receiving a read bias direct current of progressively increasing magnitude, an interrogation coil for receiving an alternating audio frequency interrogating current, a sense coil for producing answer pulse trains in time periods coordinated with time periods of pulses of the write-in current, the four coils being circularly wound into ring-like form, an insulating sheath around the coils, a first magnetic core made of wire helically wound clockwise around the sheathed coils, and a second magnetic core made of wire wound counterclockwise around the sheathed coils and first magnetic core wire, the two core wires having substantially uniform pitch for the entire circumferential extent of said toroidal form, the four coils and two magnetic cores defining a toroidal body in which the internal diameter and cross-sectional diameter thereof, and pitch of winding of each magnetic core circumferentially of said body have predetermined relationships to the thickness of the wire of the magnetic cores, so that the answer pulse trains substantially conform in time duration to the time duration of the corresponding written in information pulses, whereby the information read out is the reverse of the information written in by the write-in current.

12. An interceptor transformer for binary storage and destructive readout of multi-digit binary coded information, comprising a write coil for receiving information pulses in the form of an alternating write-in current of progressively diminishing amplitude, a read coil for receiving a read bias direct current of progressively increasing magnitude, an interrogation coil for receiving an alternating audio frequency interrogating current, a sense coil for producing answer pulse trains in time periods coordinated with time periods of pulses of the write-in current, the four coils being circularly wound into ring-like form, an insulating sheath around the coils, a first magnetic core made of wire helically wound in one direction around the sheathed coils, and a second magnetic core made of wire helically wound in opposite direction around the coils and first magnetic core wire, the two core wires having substantially uniform pitch for the entire circumferential extent of said ring-like form, the write coil being made of highly conductive nonmagnetic wire, the read, interrogation and sense coils being made of insulated conductive magnetic wire, the magnetic cores being made of repeatedly die-drawn and annealed magnetic wire having less electrical conductivity and greater magnetic retentivity than the wire of the read, interrogation and sense coils, the four coils and two magnetic cores defining a toroidal body in which the internal diameter and cross-sectional diameter thereof and pitch of winding of each magnetic core circumferentially of said body have predetermined relationships to the thickness of the wire of the magnetic cores, so that the answer pulse trains substantially conform in time duration to the time duration of the corresponding written in information pulses, whereby the information read out is the reverse of the information written in by the write-in current.

References Cited by the Examiner

UNITED STATES PATENTS

| | | | |
|---|---|---|---|
| 743,444 | 11/1903 | Burgess | 340—174 |
| 2,479,565 | 8/1949 | Wiegand | 340—174 |
| 3,137,842 | 6/1964 | Wiegand | 340—174 |

IRVING L. SRAGOW, *Primary Examiner.*

M. S. GITTES, *Assistant Examiner.*